United States Patent [19]
Olin

[11] Patent Number: 5,159,876
[45] Date of Patent: Nov. 3, 1992

[54] BALE DISCHARGING PUSHER FOR BALING MACHINES

[76] Inventor: Ray L. Olin, Box 35, New Salem, N. Dak. 58563

[21] Appl. No.: 677,347

[22] Filed: Mar. 29, 1991

[51] Int. Cl.⁵ .......................... B30B 5/04; B30B 9/00; A01D 39/00
[52] U.S. Cl. ....................... 100/88; 56/341; 100/100
[58] Field of Search ............ 100/5, 100, 87–89; 56/341–344; 414/24.6, 781, 911

[56] References Cited

U.S. PATENT DOCUMENTS

| 3,779,208 | 12/1973 | Gay | 414/24.6 |
| 3,974,632 | 8/1976 | Van der Lely | 100/88 X |
| 4,206,587 | 6/1980 | Freimuth et al. | 100/88 X |
| 4,402,176 | 9/1983 | Arnold et al. | 100/88 X |
| 4,406,221 | 9/1983 | Parrish et al. | 100/88 |
| 4,458,587 | 7/1984 | Jennings | 100/88 |
| 4,483,247 | 11/1984 | Coeffic | 100/88 |
| 4,559,770 | 12/1985 | Mast | 56/341 |
| 4,683,815 | 8/1987 | Van Ryswyk | 100/88 |
| 4,770,093 | 9/1988 | Gunther et al. | 100/88 |
| 4,779,527 | 10/1988 | Ardueser et al. | 100/88 |
| 4,889,047 | 12/1989 | Ardueser et al. | 100/88 X |

FOREIGN PATENT DOCUMENTS 3247661  6/1984  Fed. Rep. of Germany ........ 56/341

Primary Examiner—Harvey C. Hornsby
Assistant Examiner—Stephen F. Gerrity
Attorney, Agent, or Firm—Moore & Hansen

[57] ABSTRACT

The present invention provides a bale bumper for use on a machine capable of forming cylindrical bales of crop stock. The invention comprises a pair of swingable legs pivoted off each side of the machine and actuated by the tractor hydraulic system to engage a cylindrical bale during the bale discharge sequence and to push it rearwardly of the bale forming machine, thereby reducing the danger of machine damage from engagement with the bale following discharge and increasing baling efficiency by reducing the number of maneuvers normally associated with a bale discharge.

24 Claims, 6 Drawing Sheets

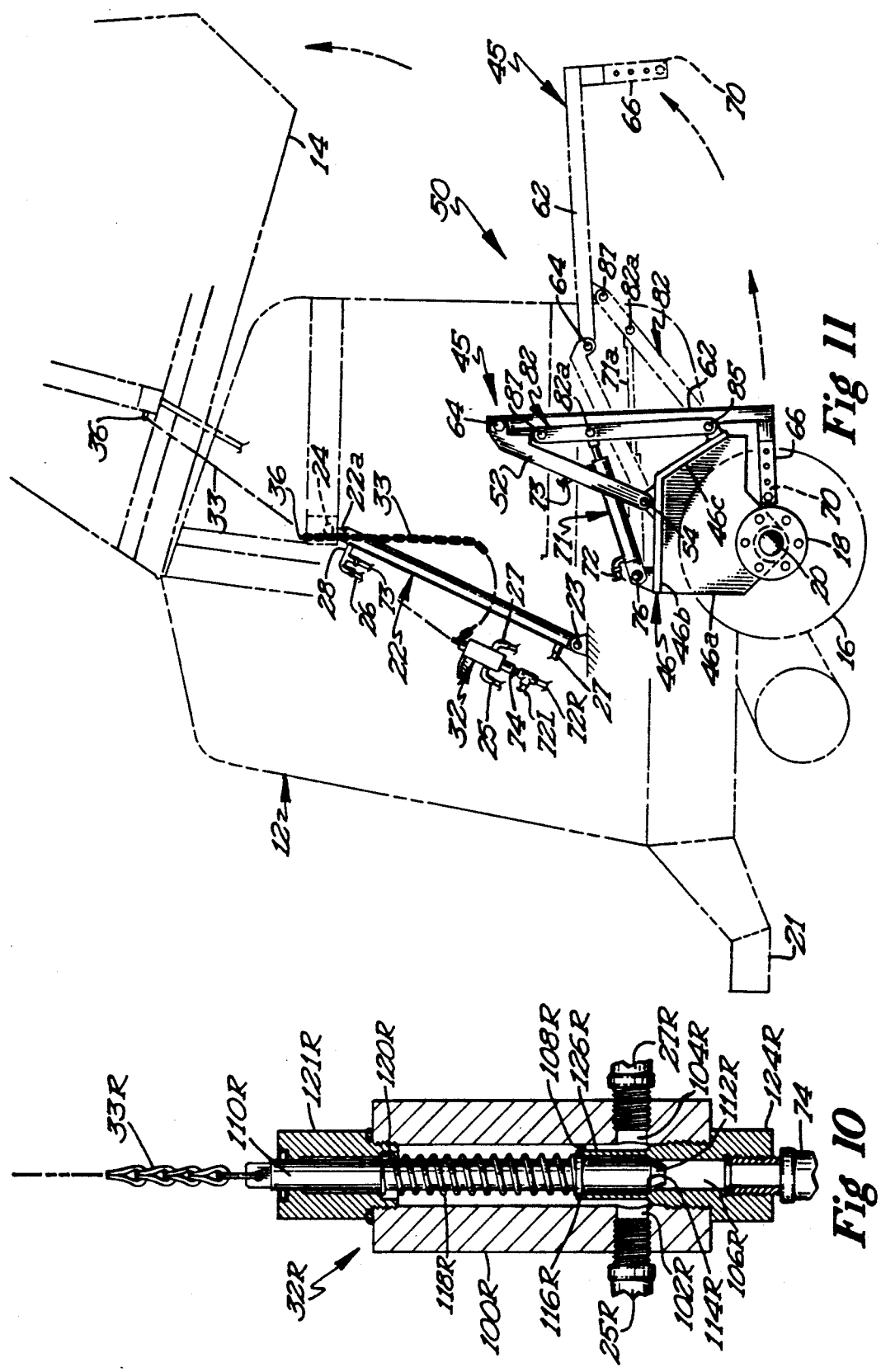

BALE DISCHARGING PUSHER FOR BALING MACHINES

The present invention relates in general to machinery for forming cylindrical bales of crop stock, commonly known as round bales, and in particular to apparatus for discharging the bale from such a machine.

BACKGROUND OF THE PRESENT INVENTION

Machinery for forming bales of crop stock, e.g., of clover or alfalfa hay, are long known in the art. In a representative operation, the crop stock would be mowed and then gathered into a windrow. A baler, either self-propelled or pulled by some other machine such as a farm tractor, would then be driven down the windrow from which it would gather the crop stock, form a bale in a bale-forming chamber, and then discharge the bale from the baler. Typically such machines form bales having either a cylindrical configuration or a rectangular configuration.

Balers for forming cylindrical bales were at one time designed and constructed to form bales capable of being easily handled manually by an adult. Such bales would typically be approximately two feet long, have a maximum diameter of about three feet, and weigh at most 100 lbs. With the reduction of available farm labor, as well as its increasing costs, however, in the last two decades there has been a move to produce cylindrical bales of a larger size to make a baling operation less labor intensive. These bales typically have a length of about five feet, a maximum diameter of about five feet, and weigh approximately 1,500 lbs. Obviously a single farmer with the appropriate mechanical bale-handling apparatus is capable of handling a large quantity of crop when in such a form.

Each bale shape had its advocates and its particular advantages and disadvantages. One of the disadvantages that round balers suffer in comparison to square balers is that a square baler is capable of a continuous baling operation. That is, unlike the round baler, a square baler is able to continue baling while discharging a tied-up bale of crop stock. With a round baler it is necessary to discontinue pick up of the crop from the windrow while the baler finishes forming the bale, ties the bale with wire or twine, and discharges the bale from the rear of the baler to the ground. Additionally, it is usually necessary to back the round baler up prior to discharging the bale so that no crop stock would be passed over by the baler. These extra movements increase baling time or if not performed resulted in unbaled crop stock being left in the field. These problems were further exacerbated with the movement to the larger balers The large round balers typically include front and rear portions forming a bale formation chamber therebetween. These portions are often pivotally attached at the tops thereof such that the rear portion or gate may be moved apart from the front portion for discharging of a bale in a manner similar to the opening of a clam shell. Because it is necessary that the rear portion of the baler be closed before baling recommences, when discharging a bale with the present large apparatus it is necessary to stop the forward movement of the baler, reverse directions, back up a predetermined distance, discharge the bale, move forward, close the rear portion, and then begin baling again. Failure to perform such a maneuver would result in the necessity of discharging a bale and then pulling ahead a sufficient distance to close the rear portion of the baler, resulting in unbaled crop stock being left on the ground. A further disadvantage of such balers is that on occasion the rear portion of the baler can strike a discharged bale when closing and can suffer damage thereto.

Prior art attempts addressing these problems have taken several approaches, namely, the ramp, the conveyor, the pusher, and the kicker. Typical of the ramp approach are U.S. Pat. No. 3,974,632 to VanderLely, U.S. Pat. No. 4,559,770 to Mast, and U.S. Pat. No. 4,566,380 to Clostermeyer et al. The VanderLely patent discloses a ramp that extends rearwardly and groundwardly of the baler for bale discharge. The ramp is formed by a lower portion of the rear wall of the baler. The Mast patent discloses a ramp that is pivotally connected to the baler frame so that the bales may be rolled to the ground upon bale discharge. Similarly, Clostermeyer teaches a ramp attached to the rear of the baler and down which a bale rolls upon discharge.

U.S. Pat. No. 4,683,815 to Van Ryswyk teaches the attachment of a chain-driven conveyor system to the rear of the baler. Upon discharge of a bale from the rear of the baler the conveying system moves the bale rearwardly of the baler to a discharge position on the ground. The conveyor system is pivotally mounted to the baler and projects rearwardly therefrom. Upon opening of the rear portion of the baler, the conveyor pivots downwardly in response to the weight of the bale such that its rearwardmost position contacts the ground.

Representative of the pusher-type solution are U.S. Pat. Nos. 4,779,527 to Ardueser et al, and 4,483,247 to Coeffic. These patents teach the use of a U-shaped pusher mechanism pivotally attached to the front section of the baler that is used to push a discharged bale away from the baler after discharge and to retain the bale in such a position while the rear gate of the baler closes.

Representative bale kickers are found in U.S. Pat. Nos. 4,458,587 to Jennings, 4,406,221 to Parrish et al, and 4,206,587 to Freimuth et al. Each of the three referenced patents teaches a bale kicker comprised of a U-shaped structure attached to the rear portion of the baler. The U-shaped structure is spring loaded such that as a discharged bale rolls over the crossbar portion of the "U," the coil spring is stretched thereby allowing the U-shaped kicker to pivot towards the ground. As the center of gravity of the bale passes over the bar rearwardly of the baler, the spring begins to retract, pivoting the U-shaped member upwardly and providing additional impetus to the bale as it is discharged from the baler. This additional rearward impetus is referred to as a kick and results in the bale being discharged slightly further rearwardly from the baler than it otherwise would.

Each of the prior art attempts just described fail to completely solve the problems of bale discharge. For example, while basically a simple device, the kicker mechanisms require springs of great strength in order to provide a rolling impetus to a bale which may weigh as much as 1,500 lbs., and thus they may fail to move the bale far enough away from the baler. In addition, as the kicker returns to its position, it does so with a force directly proportional to the spring constant of the springs used. This can result in loud clanging noises as the kicker returns to its position as well as in jarring motions and structural damage to the baler. The ramps also provide a simple solution, however they can fail to produce the desired results when baling is carried on in terrain that is not flat. The more complicated solutions of the conveyor and the pusher present additional mechanical breakdown problems. For example, the conveyor system described relies upon a chain-driven conveyance system to move a bale away from the gate. The pusher of the referenced patent utilizes a shock absorbing system to work against the energy of the spring assembly utilized in the mechanism taught there.

Thus there is a need for a bale discharge apparatus which performs several desirable functions. First, such an apparatus should ultimately deposit a bale on the ground at a desired position rearward of where it would be if it simply fell from the rear of the baler. Second, it should retain the discharged bale at the desired discharge position while the rear portion of the baler closes, thereby preventing the rear portion of the baler from coming in contact with a discharged bale. Third, such an apparatus should retain a discharged bale at the desired position so that the operator can stop the baler, discharge a bale therefrom, and then continue onward with no back up maneuvering necessary, and therefore no unbaled crop left in the field. Fourth, such an apparatus should be mechanically simple and impart minimal reaction forces to the baler from the bale discharge.

BRIEF SUMMARY OF THE PRESENT INVENTION

It is a principal object of the present invention to provide new and improved bale discharge apparatus that is not subject to the foregoing disadvantages.

It is another object of the present invention to provide new and improved apparatus useful on a cylindrical baler that reduces the amount of baler maneuvering that an operator must perform.

It is a further object of the present invention to provide new and improved apparatus useful on a cylindrical baler that reduces the possibility of damage to the baler during bale discharge.

It is yet another object of the present invention to provide new and improved apparatus useful on a baler forming cylindrical bales that reduces the amount of unbaled crop stock left in the field.

According to the present invention there is provided a bale discharge apparatus for deposition of a bale at a position a predetermined distance behind the baler and for keeping the bale in its said position, said apparatus being movable between retracted and extended positions during bale discharge. The bale discharge apparatus of the present invention includes a pair of stanchions pivotally attached to a baler, one on each lateral side thereof, boom means pivotally attached to the free end of each stanchion, a bumper comprising a bale-engaging cross-member extending between the free ends of the boom means, and actuation means for extending and retracting said apparatus at desired intervals.

Each boom means of the apparatus may include a boom and a restraining and supporting means pivotally attached between the baler and each boom. In a preferred embodiment of the present invention, each stanchion includes a pair of elongated bars pivotally attached to the front section. The actuation means includes an hydraulic cylinder attached at one end to a stationary position of the baler and attached at the other end to a pivot point on the boom means. In one embodiment the actuation means may be attached to the boom and in another to the restraining and supporting means.

The restraining and supporting means are pivotally attached at one end at a pivot point on the boom and to the front section of the baler at the other end. The bumper includes a crossbar and a pair of arms attached at each end thereof, the free ends of the arms being attached to the booms. In a preferred embodiment the crossbar includes at least one freely rotating roller means.

In operation, as the rear portion or gate of the baler opens following bale formation and tying for discharge of the bale, the actuation means extends the bumper rearwardly of the baler. As the bale is discharged from the baler it passes over the bumper to a discharge position more distant from the rear of the baler than it would had it fallen simply onto the ground. The bumper extends and rolls the bale rearwardly of the baler. The bumper acts to hold the bale at the discharge position while the rear portion of the baler begins to close. When the rear portion of the baler has closed sufficiently so as to avoid damaging contact with the bale, the actuation means retracts the bumper back to its rest position.

There is also provided in accordance with the present invention an hydraulic system including a valve useful in the operation of the just described bale discharge apparatus and other such apparatus of the pusher type. The hydraulic system interconnects the actuation means for the bale discharge apparatus and the rear gate portion of the baler to provide a single system capable of coordinated movement of the bale discharge apparatus and the baler gate. The hydraulic circuit includes a reservoir, a hydraulic pump for pumping hydraulic fluid into and out of the reservoir, and a valve means connected to the pump and in parallel to the gate and bumper actuation means, the valve means allowing uninterrupted flow between the reservoir and the gate actuation means and allowing selective flow to the bumper actuation means.

An embodiment of the valve means includes a valve housing having a fluid flow path therethrough providing uninterrupted flow of hydraulic fluid to the gate actuation means from the reservoir. The housing further includes a valve biased in a closed position on a valve seat by a biasing means such as a coil spring, the valve being operative by a plunger in response to the movement of the rear gate and being actuated when the rear gate reaches a desired open position. When actuated, the valve unseats from the valve seat allowing hydraulic fluid to flow through a branch passage into the bumper actuation means, which will preferably comprise an hydraulic cylinder.

The foregoing delineated objects of the invention as well as others will become apparent to those skilled in the art when the following detailed description of the invention is read in conjunction with the accompanying drawings. Throughout the drawings like numerals refer to similar or identical parts.

BRIEF DESCRIPTION OF THE DRAWINGS

FIG. 10 depicts a cross sectional view of a valve useful in the hydraulic system shown in FIG. 6; and FIG. 11 shows the bale bumper apparatus of the present invention mounted on baler wheel fenders and an alternate pivot point connection for the actuation means.

DETAILED DESCRIPTION OF THE PRESENT INVENTION

Figure 1:
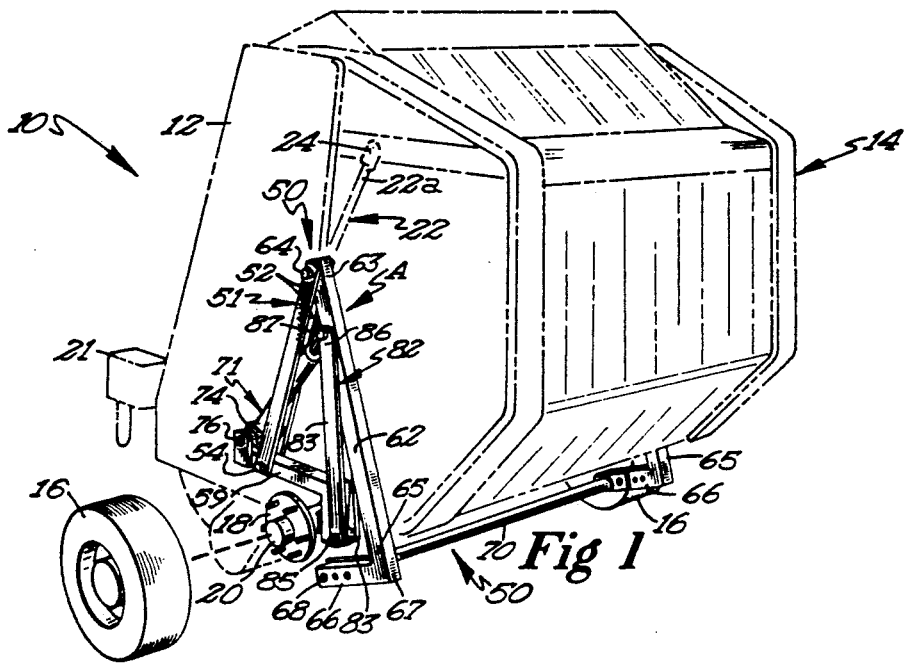
FIG. 1 illustrates in a phantom perspective view a baler for forming cylindrical bales of crop stock on which an embodiment of a bale discharge apparatus in accordance with the present invention is mounted.

FIG. 1 illustrates in phantom a baler 10 of the type used for forming cylindrical bales of crop stock. Baler 10 includes a pair of side walls 12 only one of which is shown and a rear gate portion 14 forming a bale forming chamber interiorly thereof. Baler 10 is supported by a pair of ground engaging wheels 16 that are each attached to a hub plate 18, only one of which is shown. Each wheel 16 is mounted for rotation on a stub axle 20, which is an individual axle portion of short length that does not extend from one side of the baler 10 to the other.

Figure 3:
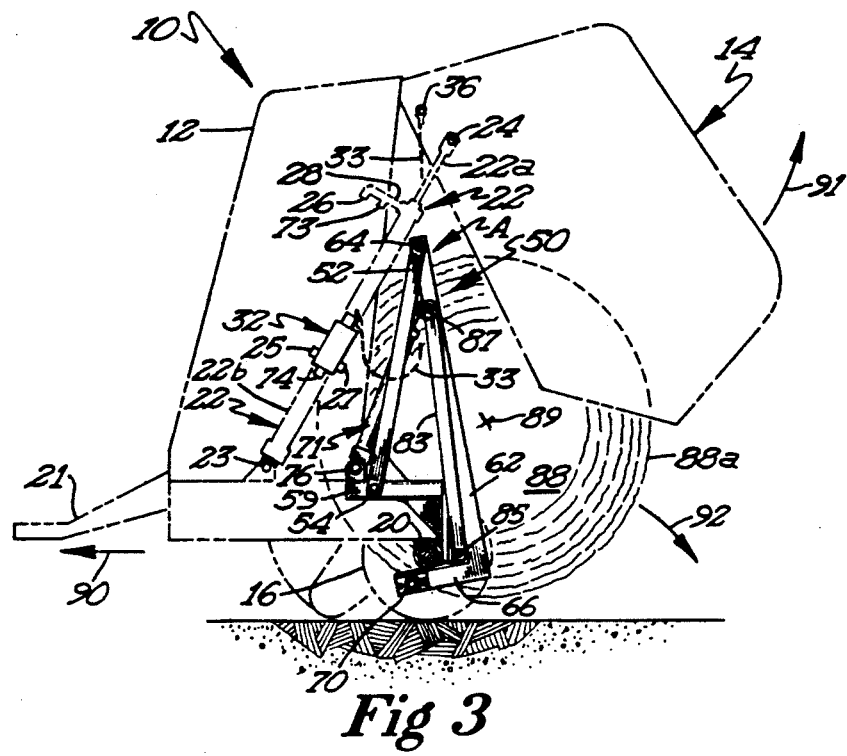
FIG. 3 is side elevation view depicting a bale being discharged from a baler of the type shown in FIG. 1.

Baler 10 is drawn through a field by a tractor attached to a hitch portion 21. Baler 10 picks up windrowed crop stock and forms it into a cylindrical bale in a known manner. After a bale has formed within the bale forming chamber of baler 10, an operating means such as dual action hydraulic cylinder 22 (shown in phantom) is actuated to open rear gate portion 14 such that the formed bale of crop stock may be discharged therefrom. As best seen in FIG. 3, cylinder 22 is comprised of a cylinder 22b attached at one end thereof to a gate cylinder pivot 23 along side wall 12 and a reciprocally extensible piston 22a attached at the other end of cylinder 22 to rear gate 14 at a gate cylinder pivot point 24. Preferably, a pair of such gate actuation cylinders are mounted in such a manner on the opposite sides of the baler.

Also shown in FIG. 1 is an embodiment of a bale discharge apparatus or bale bumper 50 in accordance with the present invention. Apparatus 50 is shown in a retracted position as it would be mounted on baler 10. In describing apparatus 50 it will be understood that bumper 50 is substantially symmetrically configured with respect to left and right sides thereof and that the description of one side will also be descriptive of the other side.

Figure 2:
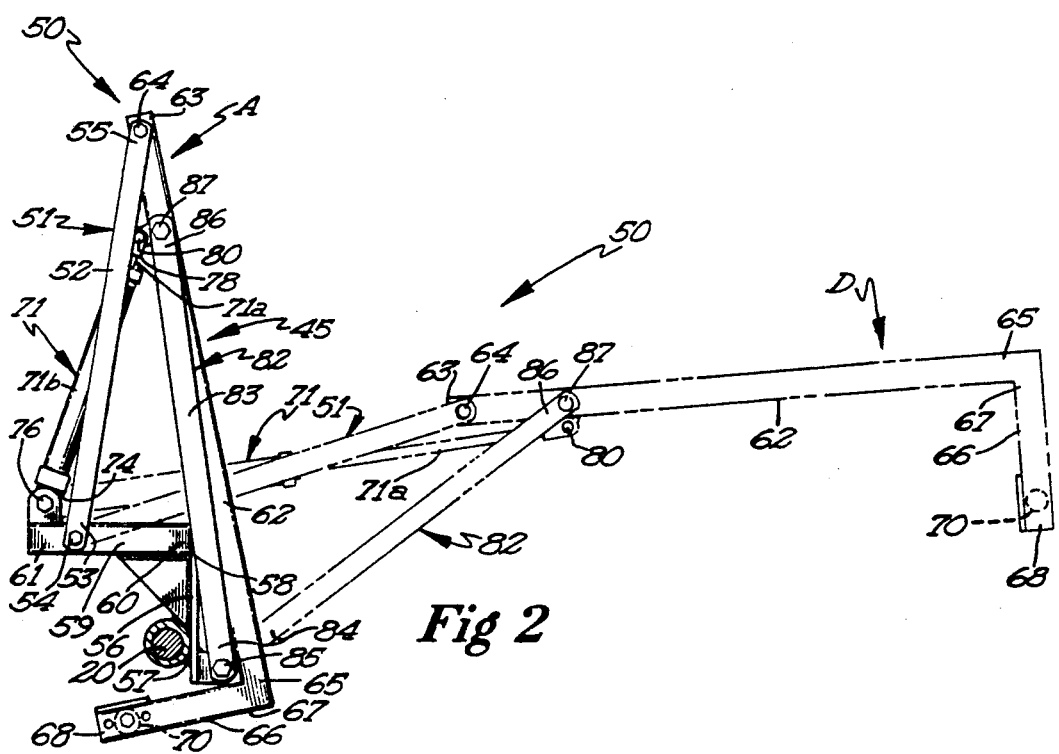
FIG. 2 shows the bale discharge apparatus of FIG. 1 in a side elevation view and depicts the apparatus in a retracted position with an extended position being shown in phantom.

Referring principally now to FIGS. 1 and 2, bale bumper 50 will be described in detail. In FIG. 2, bale bumper 50 is shown in its retracted position where it is positioned during bale forming operations and in phantom in its fully extended position following discharge of a formed bale from the baler. Bumper 50 includes a pair of stanchions 51 pivotally connected to baler 10 on opposite sides thereof. Each stanchion 51 may include a pair of stanchion bars 52, as best seen in FIG. 1, that are each attached at a lower end 53 to a first pivot point 54 disposed on baler 10. At an upper stanchion end 55 each stanchion is pivotally attached to boom means 45 comprising a boom 62 at a boom end 63. The attachment between boom end 63 and upper stanchion end 55 forms a second pivot point 64 providing a pair of swingable legs having a knee joint defined by second pivot point 64. When bumper 50 is retracted, the stanchions 51 and boom 62 are oriented generally vertically but are angularly disposed with respect to each other. When bumper 50 is in an extended position, stanchions 51 and boom 62 have a generally horizontal orientation and are substantially aligned with each other, as shown in phantom lines in FIG. 2.

The other end 65 of boom 62 terminates at an arm 66 at an arm end 67 thereof. Arm 66 may be welded to boom 62 or formed integrally therewith. The other end 68 of arm 66 is attached to a cross member 70, as best seen in FIG. 1, that extends between the ends of the arms disposed on opposite sides of the baler and that engages the bales during discharge from the baler. Arms 66 are attached to booms 62 such that when bumper 50 is in its retracted position, arms 66 extend generally forwardly beneath the body of baler 10. In a preferred embodiment, cross member 70 comprises a roller rotatably supported between booms 62. When the swingable legs are retracted, cross-member 70 may be disposed beneath side walls 12 such that each bale will strike it as the bale is discharged downwardly and will move rearwardly of the baler in response to such contact. As shown in FIG. 1, cross-member 70 may be disposed at a level below that of wheel hub 18 when the bumper 50 is in a retracted position.

Extension and retraction of bale bumper 50 is provided by a bale discharge operating means 71 that is supported at one end 74 thereof by an attachment to baler 10 at a pivot point 76. The other end 78 of operating means 71 is attached to boom 62 at a pivot point 80. Operating means 71 operates to move the swingable legs between their retracted or collapsed position during bale formation and their extended position during bale discharge. Preferably, operating means 71 is also a dual action hydraulic cylinder comprised of a cylinder 71B and a reciprocally extensible piston 71A. In any event, it is desirable that both operating means 22 and operating means 71 be of the same type such that the systems for actuating rear gate 14 and bumper 50 may be tied together into one system.

In a preferred embodiment, the boom means 45 of bale discharge apparatus of the present invention also includes a restraining and supporting means 82. As best seen in FIG. 1, restraining and supporting means 82 includes a pair of closely spaced, parallel bars 83 and is attached at an end 84 to baler 10 at a pivot 85 and at the other end 86 to a pivot 87 disposed on boom 62. Means 82 provide vertical support to bumper 50 during extension and retraction of bumper 50. Means 82 may also prevent overextension of booms 62 thereby inhibiting movement of second pivot point 64 to a point on or below a line drawn between first pivot point 54 and boom end 65. Should such an overextension occur, bumper 50 may not retract properly and may be damaged.

As further shown in FIG. 2, the discharge apparatus of the present invention may be attached to the lower portion of baler 10. Thus, discharge apparatus or bale bumper 50 may include a vertical support member 56 attached at an end 57 thereof to the tubular housing of axle 20 and attached at the other end 58 to a horizontal support member 59 at an end 60 thereof Members 56 and 59 may be joined by welding and braced as shown to provide a mounting support structure for the bale bumper assembly 50. In this configuration pivot point 54 for stanchion 51 is disposed at and attached to end 61 of horizontal member 59. Attachment of bumper 50 to baler 10 close to the ground is preferable because of better leverage obtainable with such an attachment but the present invention also contemplates its attachment anywhere on front sidewalls 12. In the configuration shown in FIGS. 1 and 2, operating means 71 is attached to the forward end 61 of horizontal support member 59.

FIG. 11 shows an alternate embodiment of apparatus 50. In this embodiment, bumper 50 is mounted on a fender 46, which is in turn rigidly attached to stub axle 20. Fender 46 includes a vertically disposed member 46a, and a horizontal member 46b and a diagonal member 46c, the latter two members 46b and 46c being attached to member 46a so as to extend in a direction outwardly from the body of baler 10 and over wheel 16. Actuation means 71 and stanchion 51 are attached to member 46b while restricting and supporting means 82 is attached to member 46c. The pivoting arc of stanchions 51 is therefore substantially parallel to the plane of rotation of wheel 16 and, in fact, is in substantial alignment therewith. This manner of mounting bumper 50 to baler 10 has the advantage of eliminating the extension of stub axles 20, which may be necessary when bumper 50 is mounted as shown in FIGS. 1 and 2. The extension of stub axles 20 in turn makes baler 10 wider and thus may complicate the cross-country transportation of some models of baler 10 from manufacturer to distributor because of roadway width restrictions.

The embodiment shown in FIG. 11 further shows an alternate location for attaching actuation means 71 to boom means 45. Thus, as shown in the Figure, actuation means 71 is attached to restraining and supporting means 82 at a pivot point 82a. This attachment presents mechanical advantages over the attachment shown in FIGS. 1 and 2 in that the cylinder of actuation means 71 is directed substantially horizontally. Thus comparing FIG. 2 with FIG. 11, it can be seen that in FIG. 2 actuation means 71 is initially disposed in a generally upright position and extends and pivots to a substantially horizontal position. In FIG. 11, however, actuation means begins and ends in a substantially horizontal position. Since it is desired to exert a substantially horizontal, rearwardly directed force, attachment of actuation means 71 to pivot point 82a on restraining means 82 rather than to pivot point 80 on boom means 41, as shown in FIGS. 11 and 2 respectively, provides an additional mechanical advantage to the bumper 50 and therefore facilitates the rearward extension of the bale bumper and, most importantly, the rearward movement of a discharged bale.

The embodiments shown in FIGS. 1, 2 and 11 may form a retrofit kit for attachment to existing balers or it may be utilized on newly manufactured models. In either situation those skilled in the art will recognize variations, modifications, or substitutions that may be made in the manner in which the present invention is attached to the baler, without departing from the spirit and scope thereof.

OPERATION OF THE PRESENT INVENTION

Figure 4:
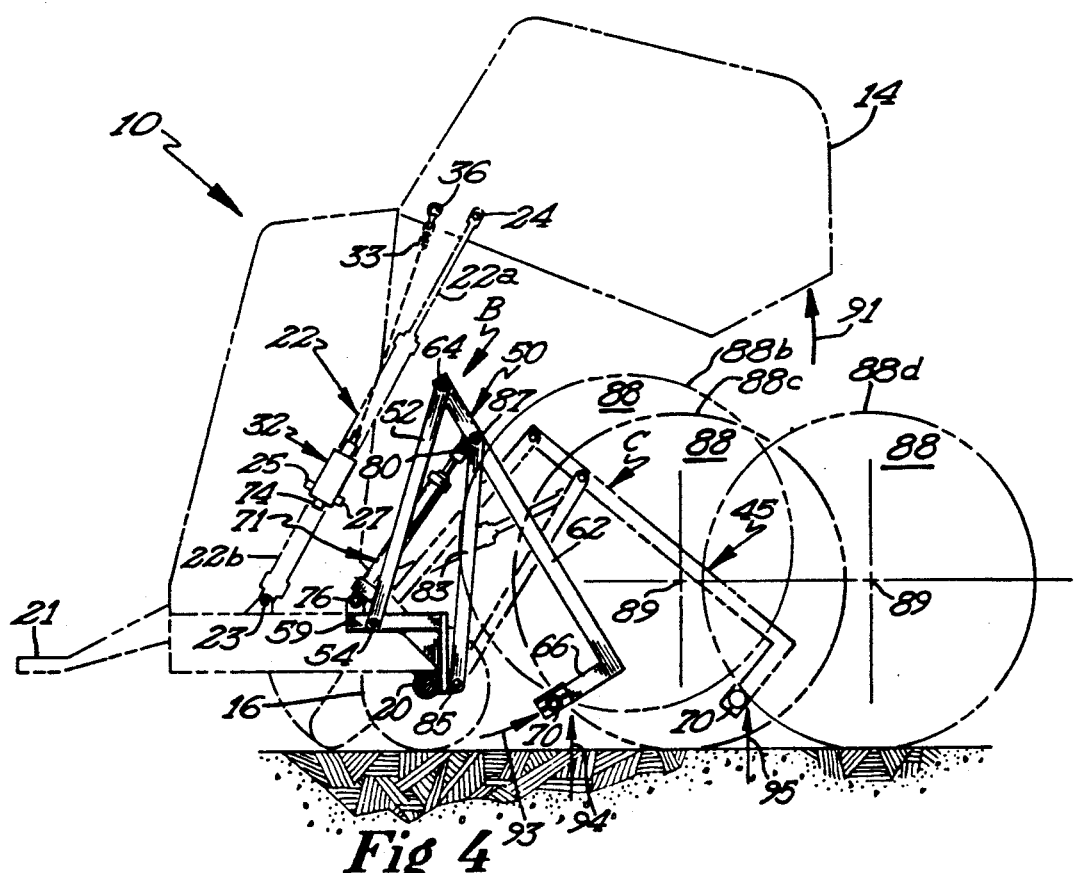
FIG. 4 shows a continuation of the bale discharge of FIG. 3 including the extension of the bale discharge apparatus of the present invention as it pushes the bale rearwardly.
Figure 5:
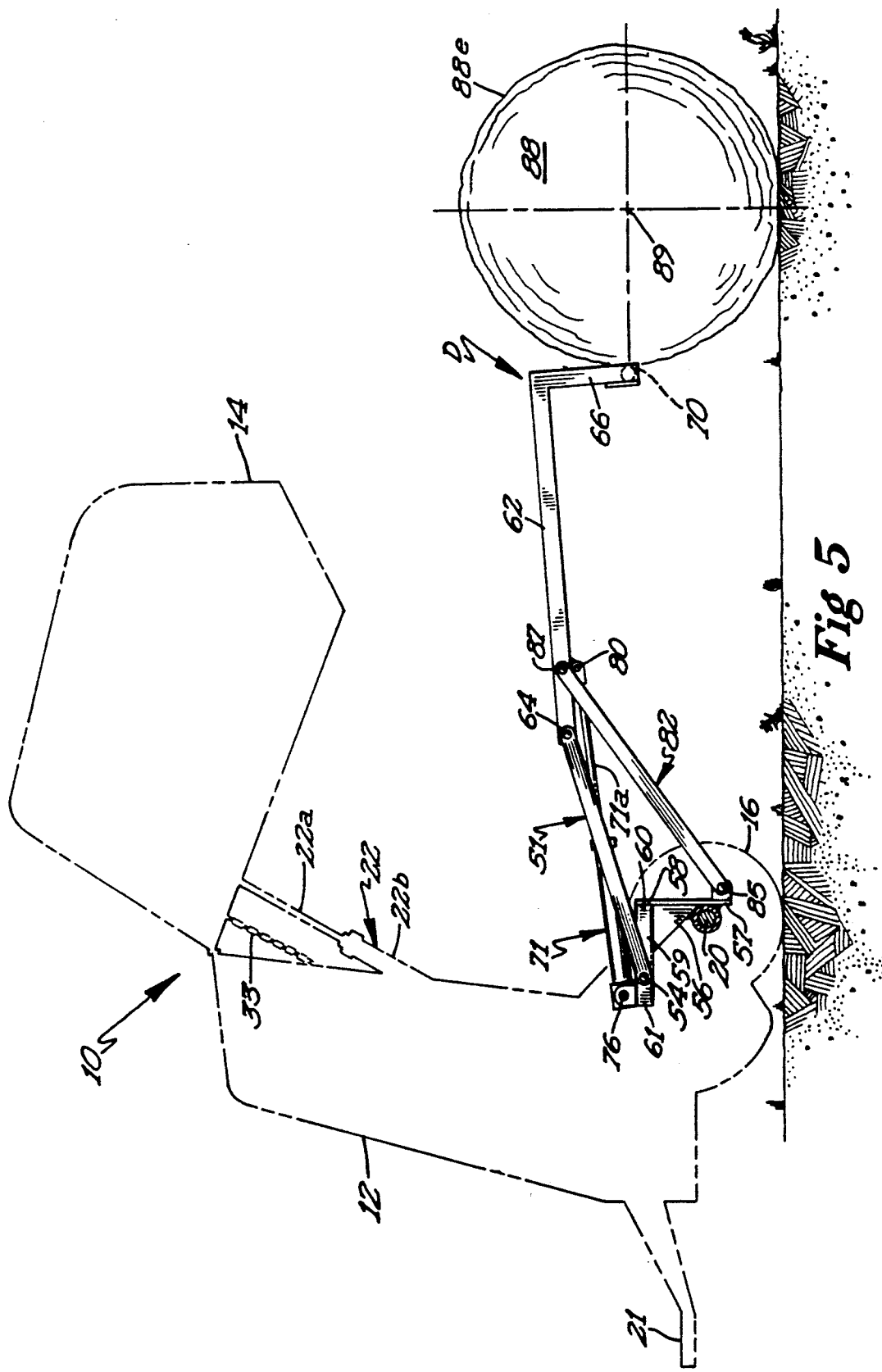
FIG. 5 shows in a side elevation a continuation of the bale discharge sequence shown in FIGS. 3 and 4.

A typical discharge sequence illustrating the operation of the bale discharge apparatus is shown in FIGS. 3, 4 and 5. In all three figures, wheel 16 is shown in phantom to more fully illustrate the operation of the bale discharge apparatus. Arrow 90 in FIG. 3 indicates the direction of baler movement. As indicated in FIG. 3, a bale 88 has been formed in the bale formation chamber of baler 10 in a manner well known in the art, and rear gate portion 14 of baler 10 has begun to open by swinging in an upward arc indicated by arrow 91. Bale 88 begins to drop from baler 10 to the ground as indicated by arrow 92. Bale 88 is shown in a discharge position 88a wherein the bottom of the bale has dropped to a position below the stub axles 20 such that it may, if desired, contact cross member 70 of bale discharge apparatus 50. Operating means 71 acts to move bumper 50 from its retracted position as indicated by letter A in FIG. 3 to its fully extended position as shown in phantom in FIG. 2 and in solid lines in FIG. 5. Thus in FIG. 4, as bale 88 continues to fall rearwardly of baler 10 to a position 88b, bumper 50 may extend to a position B along an arc indicated by arrow 93. As bale 88 drops from baler 10 the extension of bumper 50 and the consequent contact between bale 88 and cross member 70 results in a lifting force as well as a rearwardly directed pushing force being applied to the bale as it falls as indicated by arrow 93. That is, because this arc has an upward direction, cross member 70, which is in contact with bale 88 in position 88b, is exerting a lifting force on bale 88 as indicated by arrow 94. Force 93 slows the fall of bale 88 to the ground while imparting a rearward velocity to bale 88. This has the advantageous result of depositing bale 88 on the ground rearwardly of where it would land without the use of the bale discharge apparatus of the present invention.

Bale 88 continues to fall rearwardly until, as shown in FIG. 4, it lands on the ground in position 88c. As further shown in FIG. 4, as bale bumper 50 continues to extend rearwardly to a position as indicated by the letter C, cross member 70 is still in contact with bale 88 as it moves to a position 88d and is continuing to exert an upward lifting force as indicated by arrow 95 on bale 88. As the bale bumper 50 moves to its fully extended position as indicated by the letter D in FIG. 5 bale 88 has moved to a position 88e rearward of the opening and closing arc of rear gate portion 14. Bale 88 has been moved away from baler 10 a sufficient distance such that rear gate portion 14 may close without interference from bale 88. The added length given to bale bumper 50 by the knee joint assembly comprised of pivotal stanchion 51 and boom 62 permits the contact of the bale bumper 50 with the bale for a greater distance behind the baler, thus assuring that the discharged bale will be moved rearwardly out of the closing path of rear gate 14.

It should be noted that up until a full extension as indicated by letter D, the bale bumper of the present invention has been exerting an upward force on bale 88 throughout the entire discharge sequence. Furthermore, it should be noted that cross member 70 through which the lifting force is exerted on bale 88 is disposed at a position below the rolling axis 89 of the bale 88. In addition to the benefit previously noted of the more rearwardly discharged position of bale 88 on the ground, this lifting action below the rolling axis of the bale has a further advantage in that it facilitates the rearward rolling of the bale. This lifting action is advantageously pivoted off the lower portion of baler 10, which is structurally the strongest part of baler 10, through booms 62 and stanchions 51, rather than from the upper central gate portions as in prior art bale ejector designs This distinctly different pivot location reduces wear and tear on the baler and makes a bale discharge a smoother operation In other words, with the present invention there are less forward and rearward reaction forces imparted to the tractor-baler combination than occurred with prior art U-shaped pusher-ejectors because of the continuous lifting action of bale bumper 50 on bale 88 as it rolls rearwardly of the baler.

In the retraction sequence, bumper 50 will hold bale 88 in the position shown in FIG. 5 while gate 14 begins to close. When the rear gate 14 has reached a predetermined position of closing, actuation means 71 will retract bumper 50. Gate 14 may thus be safely closed without contacting bale 88 and the entire bale discharge sequence can be accomplished without any movement of the tractor/baler combination and without the loss of unbaled crop stock.

Figure 6:
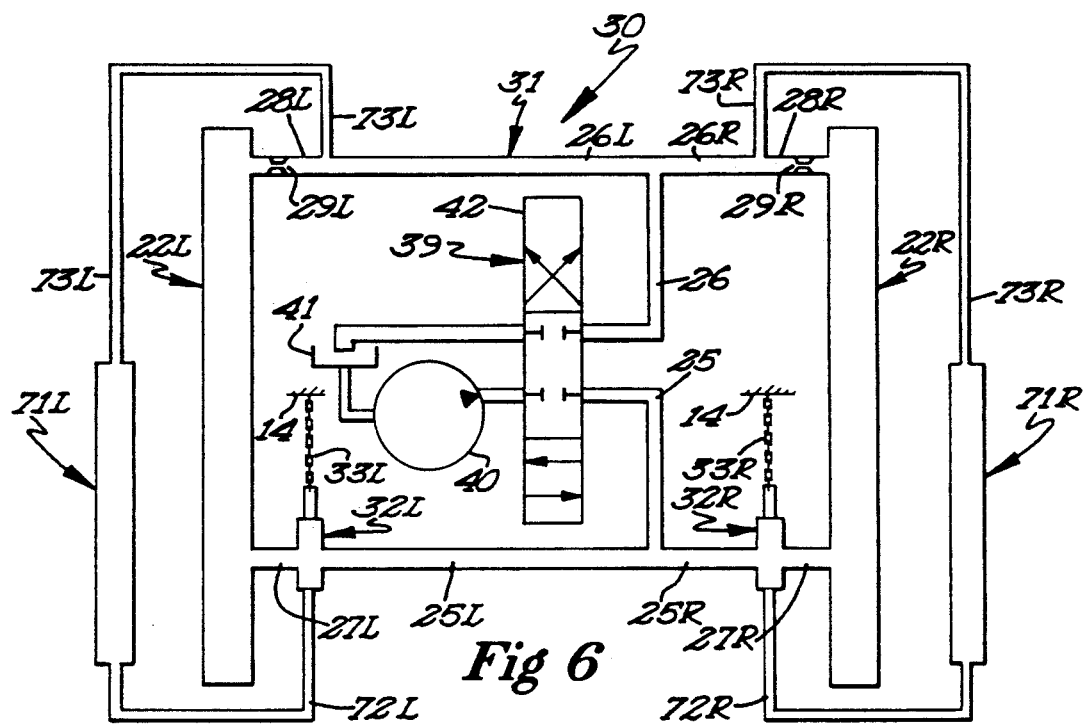
FIG. 6 illustrates an embodiment of a hydraulic circuit in accordance with the present invention for the baler and the bale discharge apparatus shown in FIG. 1.

FIG. 6 illustrates a hydraulic system that may be advantageously employed in a bale discharge apparatus of the present type. There is shown in the Figure a hydraulic circuit 30 that jointly controls the operation of rear gate cylinders 22 and bale bumper cylinders 71. It will be understood that the hydraulic system of the baler, which is included in hydraulic circuit 30, is essentially a mirror image system. Thus while a single numeral was used to reference to FIGS. 1-5 to describe the components of the baler 10 and the bumper 50, many of the components shown in those figures have an identical component on the other side of the baler. Therefore, the two components of the hydraulic system comprising the rear gate cylinders and the bale bumper cylinders will be referred to with respect to the left and right side of the baler. Thus, by way of example, while numeral 22 is used to refer to the gate cylinder of baler 10 generally, with reference to FIG. 6, numeral 22R refers to the gate cylinder on the right side of the baler and numeral 22L refers to the gate cylinder on the left side of the baler. Because the operation of the left and right sides of baler circuit 31 are identical, only the operation of the right side will be described. It will be understood that an action or event occurring on the right side will be occurring substantially simultaneously on the left side.

Referring still to FIG. 6, hydraulic system 30 comprises a baler circuit 31 and a tractor circuit 39. Tractor circuit 39 is a typical hydraulic circuit including a pump 40, an hydraulic oil reservoir 41, and a main control valve 42. Tractor circuit 39 is connected to baler circuit 31 by means of lines 25 and 26 as indicated in FIGS. 3 and 6. During extension of gate cylinders 22R and 22L, valve 42 is switched to the lower side as shown and oil is pumped by pump 40 from reservoir 41 through line 25 to a branch line 25R and a branch line 25L.

Line 25R connects line 25 to a special valve 32R which will be discussed more fully below. Oil passes substantially unimpeded through valve 32R into a connecting line 27R that connects valve 32R to gate cylinder 22R. When gate cylinder 22R is substantially extended valve 32R shunts oil into line 72R, which connects bumper cylinder 71R with valve 32R. Valve 32 is activated by means of an actuation means 33, such as a chain or cable attached to valve 32 and to rear gate 14 at a connection point 36 as best seen in FIG. 3. Connection point 36 may be disposed where desired on rear gate portion 14 and may be located at pivot point 24. When rear gate 14 reaches a desired degree of opening, activation means 33 will be pulled tight, thereby activating valve 32 to begin shunting oil into line 72R. Pressure supplied through line 72R extends cylinder 71R thereby causing bumper 50 to extend as previously described. During extension of gate cylinder 22R, oil is returned to reservoir 41 via line 28R, which connects cylinder 22R with a line 26R, and by line 26 which connects line 26R with tractor system 39. Similarly, during the extension of bumper cylinder 71R, oil is returned via a line 73R, which connects cylinder 71R to line 26R, and via line 26 which, as previously noted, connects line 26R with tractor system 39.

Following the discharge of a bale, the retraction of the gate and the bale bumper begins. Control valve 42 is switched into the upper position shown in FIG. 6 and oil is pumped via line 26 into a pair of branch lines 26R and 26L. Again, since the operation of the right and left sides are identical, the gate closure operation will be described with reference to the right side only, it again being understood that the actions and events occurring on the right side are occurring substantially simultaneously on the left. Thus, oil is transmitted to cylinder 22R from tractor system 39 via lines 26, 26R and 28R. Oil pressure operating on cylinder 22R, as well as the weight of the open gate, forces cylinder 22R to retract thereby closing rear gate portion 14. Oil is returned to reservoir 41 of tractor system 39 from cylinder 22R via lines 27R, 25R and 25.

During retraction of cylinder 22R, a back pressure is exerted on bumper cylinder 71R through line 72R because of the weight of rear gate portion 14. This back pressure prevents cylinder 71R from beginning to retract even though pressure is exerted on cylinders 22R and 71R simultaneously through lines 28R and 73R, respectively, until rear gate 14 is substantially closed. Thus as gate portion 14 reaches a position of substantial closure, the back pressure exerted on cylinder 71R due to the weight of gate 14 will substantially diminish, thereby reducing the back pressure exerted on cylinder 71R through line 72R. This will allow cylinder 71R to begin to retract and so retract bumper 50. Baler circuit 31 may include flow restrictors 29R and 29L disposed in lines 28R and 28L respectively to sequence the closing of rear gate 14 and bumper 50 as desired. That is, by controlling the oil flow through lines 73R and 28R so that a pressure is exerted on cylinder 71R sufficient to overcome the back pressure exerted by the weight of gate 14, bumper 50 may be retracted at a desired time. For example, in the preferred embodiment, the flow passage through restrictor 29R is so sized that bumper cylinder 71R will start the retraction strike of its piston 71A from the fully extended position shown in FIGS. 2 and 5 to begin the retraction and collapsing of bumper 50 before gate 14 is fully closed. This has the benefit of reducing the time required for the complete bale discharge cycle.

Figure 7:
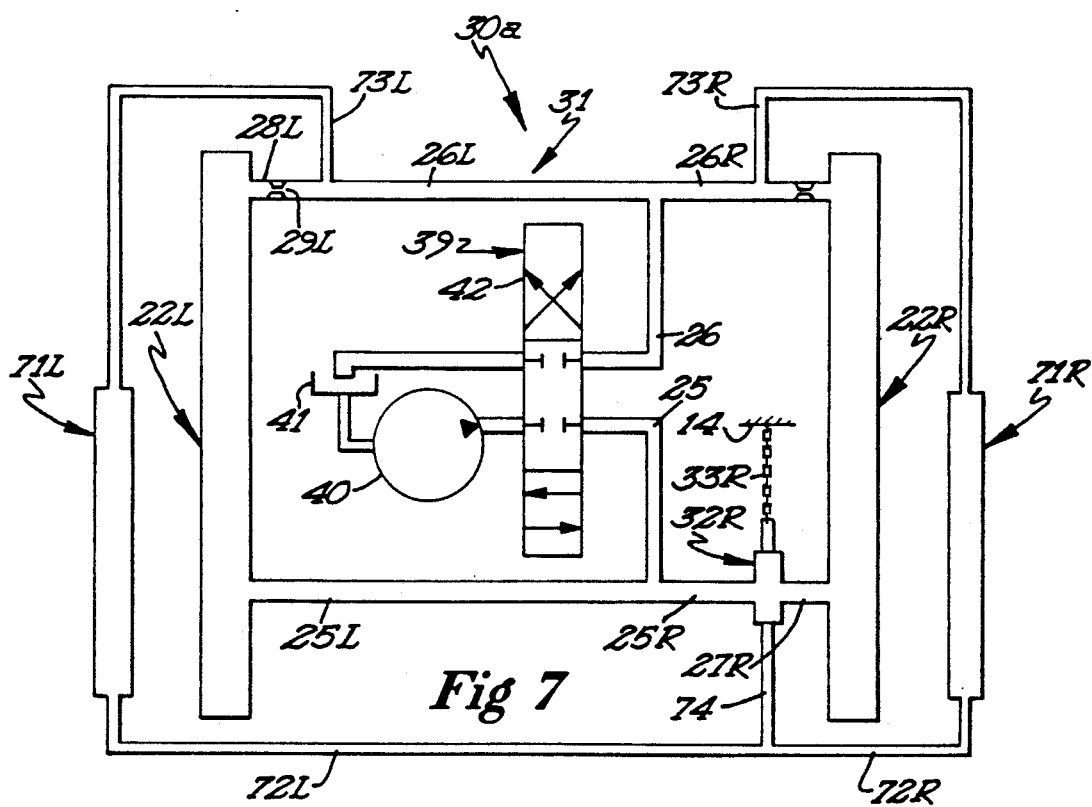
FIG. 7 illustrates another embodiment of a hydraulic circuit in accordance with the present invention for the baler and the bale discharge apparatus shown in FIG. 1.
Figure 8:
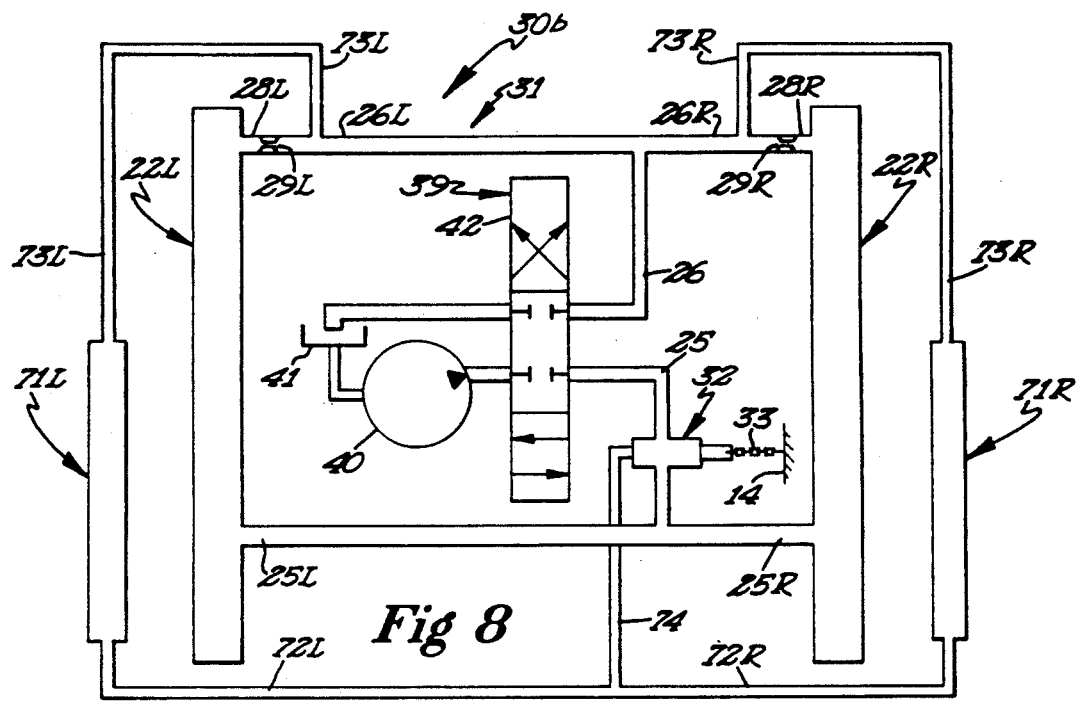
FIG. 8 illustrates another embodiment of a hydraulic circuit in accordance with the present invention for the baler and the bale discharge apparatus shown in FIG. 1.
Figure 9:
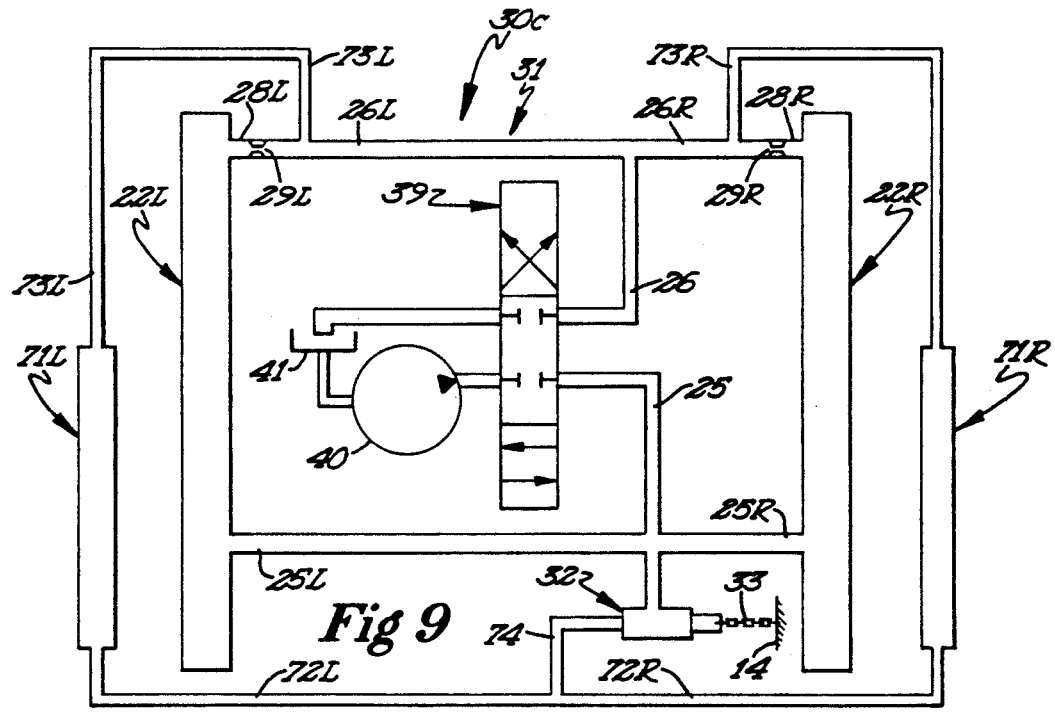
FIG. 9 illustrates another embodiment of a hydraulic circuit in accordance with the present invention for the baler and the bale discharge apparatus shown in FIG. 1.

FIGS. 7, 8 and 9 illustrate alternative hydraulic circuit interconnections in which only a single valve means is used to actuate the bumper cylinders 71R and 71L. Thus, in FIG. 7, an embodiment 30a is shown wherein valve 32L and, consequently, line 27L have been eliminated. Valve means 32R is operatively connected to a line 74 through which hydraulic oil flows into lines 72R and 72L for actuating bumper cylinders 71R and 71L respectively. Thus, when valve means 32R is actuated by linking means 33R in response to the opening motion of gate 14, oil will flow from the reservoir through line 25 into line 25R, then into valve means 32R and out thereof through line 74. In all other respects, the hydraulic circuit illustrated in FIG. 7 functions the same as that illustrated in FIG. 6.

FIG. 8 shows again a single valve circuit embodiment 30b of the present invention. In this embodiment, however, valve 32 is disposed in hydraulic circuit 30b before line 25 branches into lines 25R and 25L. Once again when valve means 32 is actuated by linking means 33, oil flows through line 74 into line 72R and 72L to actuate gate cylinders 71R and 71L respectively. As with FIG. 7, FIG. 8 illustrates an hydraulic circuit 30b which functions in all respects the same as hydraulic circuit 30 of FIG. 6.

FIG. 9 illustrates an hydraulic circuit 30c that utilizes a valve means 32A similar to valve means 32 illustrated in FIGS. 6, 7 and 8 with the following difference noted. Valve means 32A of FIG. 9 is connected directly into line 25 after lines 25R and 25L branch off. Because of this positioning in the circuit 30c, valve means 32A need not have an uninterrupted flow passage for oil as do valve means 32 as shown in FIGS. 6, 7 and 8. Thus with the embodiment shown in FIG. 9, valve means 32A will allow oil passage through the valve means only when actuated by linking means 33. Upon that occurrence, oil will flow through the valve into lines 72R and 72L to actuate bumper cylinders 71R and 71L. Other than the difference noted, hydraulic circuit 30c functions identically to that of hydraulic circuits 30, 30a, and 30b illustrated in FIGS. 6, 7 and 8 respectively While FIGS. 7 and 8 teach positioning of the single valve means in the right side of the hydraulic circuit, it will be understood that the valve means could be positioned as well on the left side of the circuit.

FIG. 10 shows a valve 32R that may find application in the present invention. As previously noted in the discussion of the other components of the hydraulic system, valve 32L is identical to valve 32R and it will be understood that the components of valve 32R will also be found in valve 32L. As shown in the Figure, valve 32R includes a casing 100R having a first flow passage 102R, a second flow passage 104R, a third flow passage 106R, and a chamber 108R. First, second and third passages 102R, 104R, and 106R are respectively connected to lines 25R, 27R, and 72R (or 74), by means known to the art, such as crimping or screwing. A plunger 110R is slidably received within chamber 108R.

Plunger 110R is attached at one end to chain 33R and has a valve 112R disposed at the other end for seating on a valve seat 114R disposed within housing 100R. As shown, this valve seat 114R may be directly at the end of line 72R. Plunger 110R includes a collar or shoulder 116R that is rigidly fixed thereto. A biasing means such as coil spring 118R is disposed around plunger 110R. Spring 118R extends between collar 116R and a recessed shoulder 120R formed in fitting 121R on one end of housing 100R. Fitting 121R, which may be screwed into chamber 108R, is disposed within the opening of chamber 108R to define the upper limit of movement of plunger 110R. A fitting 124R closes the end of housing 100R to which line 72R is connected. The internal end of fitting 124 is formed to include a tubular extension 126R, the top of which serves as a stop for collar 116R and thus for plunger 110R. Spring 118R normally biases plunger 110R to the position shown in FIG. 10 wherein valve 112R is urged against valve seat 114R to close flow passage 106R, thus blocking flow through line 72R.

Plunger 110R is configured to provide a substantially uninterrupted flow between lines 25R and 27R through passages 102R and 104R, thereby allowing a substantially unimpeded flow at all times between these lines. During a bale discharge, when valve 32R is activated as previously referred to by the opening movement of gate 14 as indicated in FIG. 3, plunger 110R is pulled upward by the tightening of chain 33R and thereby valve 112R is unseated from valve seat 114R. Upward movement of plunger 110R is resisted by biasing means 118R. As valve 112R unseats, oil from line 25R begins to flow through passage 106R into line 72R, thereby extending cylinder 71R and beginning the extension of bumper 50.

During the closing operation of gate 14, chain 33R will slacken due to the downward movement of its upper attached end, thus relieving the compression force on spring 118R and permitting it to extend, forcing plunger 110R downward and seating valve 112R on valve seat 114R. This seating action is initially prevented by the back hydraulic pressure exerted on valve 112R through line 27R. Thus, during the closing operation, pressure will be exerted through lines 26, 26R, and 73R on cylinder 71R. Oil will return to the oil reservoir 41 through line 72R and valve 32R. This backward flow of oil will hold valve 112R open. When gate 14 has substantially closed, oil will flow through line 72R, through valve 32R and into line 25R. This back flow of hydraulic oil will have sufficient pressure to prevent biasing means 118R from seating valve 112R, thereby providing an open flow path for oil to return to reservoir 41 from cylinder 71R.

Biasing means 118R acts to keep valve 112R seated on valve seat 114R until plunger 110R is pulled upwardly by chain 33R. If desired, biasing means 118R may be disposed externally of housing 100R. By selectively determining the amount of slack disposed in chain 33R, valve 32R can be selectively activated at a predetermined position of gate 14 during its opening movement to begin extension of bumper 50. That is, by reducing the amount of slack in chain 33R, valve 32R will be opened more quickly in the gate opening sequence, and by increasing the amount of slack valve 32R will be opened later in the sequence.

Valve means 32A which is used in the hydraulic circuit embodiment of FIG. 9 has a slightly different configuration than that shown in FIG. 10. Valve means 32A would not include second branch 104R for attachment to line 27R as illustrated in FIG. 10. Thus, no oil will flow through valve means 32A until valve 112 is unseated from valve seat 114. When the valve is opened, oil will flow directly from line 25 and valve outlet line 74 into lines 72R and 72L. This valve construction requires only two connections to be operable rather than the three of the previous version since oil does not need to flow unimpeded through the valve housing to actuate the rear gate cylinders. In all other respects, the valve means 32A shown in FIG. 9 functions identically to that described with respect to FIG. 10.

It is contemplated that means other than chain 33 may be utilized to actuate valve plunger 110R. Any type of lost motion mechanical connection between plunger 110R and gate 14 would be satisfactory. Also, actuating means for plunger 110R other than a mechanical connection could be used. For example, valve 32 could be of the solenoid type with plunger 110R being reciprocally disposed within a solenoid coil connected in an electrical control circuit. A limit switch would be mounted at an appropriate position in the path of movement of gate 14, to be tripped by gate 14 during its opening movement The limit switch actuation would complete a circuit through the solenoid coil, the energization of which would pull plunger 110R to its open position, unseating valve 114R.

It is contemplated that numerous alterations, modifications, and substitutions will suggest themselves to those skilled in the art all of which fall within the spirit and scope of the present invention. Accordingly it is intended that the scope of the present invention be limited only by the scope of the appended claims.

What is claimed is:

1. In a baler of the type used for forming a substantially cylindrical bale of crop stock and comprising a body having side walls and a rear gate portion defining a bale-forming chamber and further having a rear end wherein said rear gate portion is movable from a closed position for bale formation to an open position for discharge of said bale from said chamber, a bale discharge apparatus for pushing a bale rearwardly away from the said baler, said apparatus comprising:
   a pair of stanchions, said stanchions being pivotally connected at one end thereof at first pivot points to said baler body on opposite sides thereof;
   a pair of booms, each boom pivotally connected at one end thereof to the other end of one of said stanchions at a second pivot point to provide on opposite sides of said baler body a pair of swingable legs having a knee joint defined by said second pivot points;
   a bale-engaging cross member supported from the other ends of said booms and extending therebetween, said swingable legs being movable between a retracted, collapsed position when a bale is being formed and an extended position projecting rearwardly behind the baler after a bale has been discharged, said cross member being positioned adjacent said rear end of said baler under said rear gate portion in said retracted position of said swingable legs and engaging the bale as said legs are moved from said retracted to said extended position so as to push the bale rearwardly of said baler; and
   operating means connected to said swingable legs, said operating means being operable to move said swingable legs between said retracted and said extended positions.

2. The apparatus of claim 1 wherein:
said cross member is so positioned beneath said body side walls in said retracted position of said swingable legs that each discharging bale strikes said cross member and moves rearwardly to a position on the ground behind said baler.

3. The apparatus of claim 1 wherein:
said cross member comprises a roller rotatably supported between the said booms, whereby bales discharging from said baler roll over said roller, and said roller providing rolling contact with each bale when said legs are moved from said retracted position to said extended position, said cross member holding each discharged bale in said position on the ground behind the baler after discharge.

4. The apparatus of claim 1, and further including:
means for raising and lowering said gate portion between said open and closed positions, said means being pivotally connected to said rear gate portion and to said baler body side walls at pivotal connection points; and
said operating means comprises a pair of power cylinders pivotally connected at one end thereof to said baler body on opposite sides thereof at locations below said pivotal connection points of said means for raising and lowering said gate portion to said baler body side walls, said power cylinders being connected at their opposite ends to said booms.

5. The apparatus of claim 1 wherein:
said stanchions and said booms are oriented generally vertically when said legs are in said retracted position.

6. The apparatus of claim 1 wherein:
said stanchions and said booms are angularly disposed with respect to each other when said legs are in said retracted position and are in substantially straight, generally horizontal, alignment with each other when said legs are in said extended position.

7. The apparatus of claim 1 wherein:
said baler incorporate a pair of ground engaging wheels adjacent said rear end thereof, said wheels being supported on generally horizontally extending wheel axles, and said cross member being positioned at a level at least as low as said wheel axles when said legs are in said retracted position.

8. The apparatus of claim 1 wherein:
said cross member is supported from said booms by a pair of arms, each arm being attached at one end thereof to a boom and at the other end to an end of said cross member, said arms extending generally forwardly under the baler body when said legs are in said retracted position.

9. The apparatus of claim 1, and further including:
a pair of elongated restraining and supporting means pivotally attached to opposites sides of said baler body at one end thereof and at the other end thereof to one of said booms at a third pivot point.

10. The apparatus of claim 9 wherein:
each of said restraining and supporting means comprises at least one elongated bar.

11. The apparatus of claim 10 wherein:
said operating means comprises at least one fluid cylinder which is pivotally attached at one end thereof to one of said elongated bars and supported at its opposite end from said baler body.

12. The apparatus of claim 1 wherein:
said operating means comprises at least one fluid cylinder which is pivotally attached at one end thereof to s id baler body.

13. The apparatus of claim 1 and further including:
means for actuation of said operating means, said actuation responsive to the movement of said rear gate portion towards said open position from said closed position.

14. The apparatus of claim 13 wherein:
said actuation means comprises mechanical linkage means connected between said operating means and said rear gate portion.

15. The apparatus of claim 14 wherein:
said actuation means comprises a chain which is slack when said gear gate portion is in said closed position an which becomes taut to activate said operating means when said rear gage portion is in said predetermined position.

16. The apparatus of claim 13 wherein:

said operating means comprises at least one hydraulic cylinder and valve means for controlling the flow of hydraulic fluid to and from said cylinder, said actuation means being operatively connected to said valve means.

17. The apparatus of claim 1 wherein said baler includes:
 a pair of ground engaging wheels adjacent the rear end thereof; and
 a fender mounted in overlying relation to each of said wheels, said stanchions and said operating means being mounted on said fenders.

18. In a baler of the type used for forming a substantially cylindrical bale of crop stock and comprising a body having side walls and a rear gate portion defining a bale-forming chamber, and wherein said rear gate portion is movable from a closed position for bale formation to an open position for discharge of said bale from said chamber, a bale discharge apparatus comprising:
 a pair of vertical support members, each respectively attached at an end thereof to opposite sides of said baler body;
 a pair of horizontal support members, each respectively attached at an end thereof to the other end of one of said vertical support members;
 a pair of stanchions on opposite sides of said baler body, each stanchion being pivotally attached at the lower end thereof at a first pivot point to one of said horizontal support members;
 a pair of booms on opposite sides of said baler body, each boom being pivotally attached at a first end thereof to the upper end of one of said stanchions at a second pivot point;
 a cross member supported from the other ends of said booms and extending therebetween;
 operating means attached to said booms and operable to move said booms and said stanchions between a retracted, collapsed position along said body side walls occupied by said discharge apparatus when said rear gate portion is closed, and a rearwardly extended position for holding a discharged bale away from the rear end of the baler after said rear gate portion is opened for discharging a bale.

19. The apparatus of claim 18 wherein:
 said cross member is supported from said booms by a pair of arms, each arm being attached at one end thereof to a boom and at the other end to an end of said cross member, whereby each discharged bale rolls over and is held in position by said cross member.

20. The apparatus of claim 19 wherein:
 said operating means comprises an hydraulic cylinder connected at one end to one of said elongated restraining and supporting means and at its opposite end to a pivotal location adjacent to said first pivot point.

21. The apparatus of claim 18 and further including:
 a pair of elongated restraining and supporting means, said restraining and supporting means being pivotally attached at one end thereof to opposite sides of said baler body and at the other end thereof to one of said booms at a third pivot point.

22. The apparatus of claim 18 wherein:
 said vertical support members are attached at said end thereof to said baler body adjacent to the bottom thereof.

23. In a baler of the type used for forming a substantially cylindrical bale of crop stock and comprising a body having side walls and a rear gate portion defining a bale-forming chamber and further having a rear end and a bottom, wherein said rear gate portion is movable from a closed position for bale formation to an open position for discharge of said bale from said chamber, a bale discharge apparatus comprising:
 a pair of booms, each of said booms having a pair of ends and being pivotally supported at a first boom end on opposite sides of said baler body by at least one support member, said support members being pivotally mounted at a support member end adjacent to said bottom of said baler body;
 a bale-engaging cross member supported from the other ends of said booms and extending therebetween; and
 operating means comprising at least one fluid cylinder pivotally supported at one end thereof from said baler body and connected at the other end to said booms, said operating means being operable to move said booms between a retracted position when a bale is being formed and an extended position projecting rearwardly behind the baler after a bale has been discharged from the baler, said cross member being so positioned at a low level adjacent to said rear end of said baler in said retracted position of said booms that each discharging bale strikes said cross member and moves rearwardly to a position on the ground behind said baler.

24. Baler apparatus as defined in claim 23 wherein:
 said cross member comprises a roller rotatably supported between said other ends of said booms, said roller being positioned adjacent to said bottom of said baler body in the path of a bale discharging from said chamber when said rear gate portion is moved to said open position, whereby bales discharging from said roll over said roller, and said roller thereby provides rolling contact with each bale when said booms are moved to said extended position to hold each discharged bale in said position on the ground behind the baler after discharge.

* * * * *

UNITED STATES PATENT AND TRADEMARK OFFICE
CERTIFICATE OF CORRECTION

PATENT NO. : 5,159,876

DATED : November 3, 1992

INVENTOR(S) : Ray L. Olin

It is certified that error appears in the above-identified patent and that said Letters Patent is hereby corrected as shown below:

Column 10, line 56, delete "strike" and insert --stroke-- therefor;

Column 14, line 22, delete "incorporate" and insert --incorporates-- therefor;

Column 14, line 52, delete "s id" and insert --said-- therefor;

Column 14, line 65, delete "an" and insert --and-- therefor;

Column 14, line 66, delete "gage" and insert --gate-- therefor;

Column 16, line 50 insert "baler" after "from said".

Signed and Sealed this

Twenty-sixth Day of October, 1993

*Attest:*

BRUCE LEHMAN

*Attesting Officer*        *Commissioner of Patents and Trademarks*